(12) United States Patent
Rawlings

(10) Patent No.: US 7,921,843 B1
(45) Date of Patent: Apr. 12, 2011

(54) SYSTEM AND METHOD FOR ANCHORING SOLAR PANELS TO A FLAT SURFACE

(76) Inventor: Lyle K. Rawlings, Hopewell, NJ (US)

( * ) Notice: Subject to any disclaimer, the term of this patent is extended or adjusted under 35 U.S.C. 154(b) by 104 days.

(21) Appl. No.: 12/026,994

(22) Filed: Feb. 6, 2008

Related U.S. Application Data

(60) Provisional application No. 60/899,702, filed on Feb. 6, 2007.

(51) Int. Cl.
*F24J 2/52* (2006.01)
*E04B 7/02* (2006.01)
*E04D 13/18* (2006.01)

(52) U.S. Cl. .......................... 126/623; 52/90.2; 52/173.3
(58) Field of Classification Search ................... 126/623; 52/90.2, 173.3
See application file for complete search history.

(56) References Cited

U.S. PATENT DOCUMENTS

| 5,505,788 | A | * | 4/1996 | Dinwoodie | 136/246 |
|---|---|---|---|---|---|
| 5,746,839 | A | * | 5/1998 | Dinwoodie | 136/251 |
| 6,105,316 | A | * | 8/2000 | Bottger et al. | 52/173.3 |
| 6,672,018 | B2 | * | 1/2004 | Shingleton | 52/173.3 |
| 6,809,251 | B2 | * | 10/2004 | Dinwoodie | 136/251 |
| 6,968,654 | B2 | * | 11/2005 | Moulder et al. | 52/173.3 |
| RE38,988 | E | * | 2/2006 | Dinwoodie | 136/251 |
| 7,435,897 | B2 | * | 10/2008 | Russell | 136/244 |
| 2006/0053706 | A1 | * | 3/2006 | Russell | 52/173.3 |
| 2008/0087275 | A1 | * | 4/2008 | Sade et al. | 126/623 |
| 2008/0172955 | A1 | * | 7/2008 | McClintock et al. | 52/173.3 |
| 2009/0242014 | A1 | * | 10/2009 | Leary | 136/251 |

OTHER PUBLICATIONS

RapidRac Installation Manual 600.1; Jan. 2008.

* cited by examiner

*Primary Examiner* — Henry Yuen
*Assistant Examiner* — Frances Kamps
(74) *Attorney, Agent, or Firm* — LaMorte & Associates

(57) ABSTRACT

A mounting system that is used to mount a solar panel array to a flat roof. The system utilizes mounting supports that hold solar panels at an inclined angle. Each mounting support includes a first mounting ledge, a second mounting ledge, a flat base section and an inclined section that is disposed between the flat base section and the first mounting ledge. The first mounting ledge, second mounting ledge, flat base section and inclined section are all integrally formed from a common sheet of metal. A solar panel is attached between two of the mounting supports. Once mounted, the solar panel extends from the first mounting ledge of a first mounting support to a second mounting ledge of a second mounting support. Weights are then placed on the flat base section of the mounting supports to passively anchor the assembly to the roof.

11 Claims, 4 Drawing Sheets

US 7,921,843 B1

SYSTEM AND METHOD FOR ANCHORING SOLAR PANELS TO A FLAT SURFACE

RELATED APPLICATIONS

This application claims priority of Provisional Patent Application No. 60/899,702, entitled, Photovoltaic Mount, which was filed Feb. 6, 2007.

BACKGROUND OF THE INVENTION

1. Field of the Invention

In general, the present invention relates to the support framework that is used to interconnect a solar panel to a flat or nearly flat surface, such as a flat roof. More particularly, the present invention relates to support frameworks that hold solar panels at an inclined angle.

2. Prior Art Description

Given concerns about pollution, global warming and rising energy costs, many companies are trying to become more energy efficient and environmentally friendly. One way to achieve these goals is to use solar energy to produce electricity and/or heat water. Many commercial buildings have flat roofs. These large open roofs are ideal for placing an array of solar panels. However, many problems are encountered when solar panels are placed on a flat roof.

The flat roofs of commercial buildings comprise a large proportion of the solar panel arrays built in the U.S. and elsewhere. If the arrays should require many penetrations in order to fasten the panel mounting structures to the roofs, such penetrations carry a risk of producing roof leaks. It is for this reason that building owners often require that solar panel arrays and other such auxiliary objects be free standing on the roof and not be physically attached to the roof.

If solar panel arrays cannot be secured in place on a roof using fasteners, they must still be designed to be wind resistant. Solar panels are large flat structures. Gusts of wind acting under a solar panel can create lifting forces large enough to displace the solar panel.

Solar panels can be weighted to increase wind resistance. However, roofs have weight load limitations. Solar panel arrays must be made light so that they do not indent the roof or combine with a large snowfall to surpass the weight capacity of the roof.

To further complicate matters, solar panels are rarely installed flush against a roof. In most latitudes, solar panels are most efficient when mounted at an inclined angle. Accordingly, solar panels are traditionally placed upon some type of support framework that holds the solar panels at an incline. Mounting solar panels at inclined angles, however, exposes the underside of the panel to the wind and greatly reduces the wind resistance of the array.

In the prior art, the above-mentioned problems are addressed by using complex mounting frames that hold solar panels upon a flat roof. The mounting frames are comprised of a network of interconnected brackets that hold the solar panels at inclined angles. Weights are attached to the mounting frame to increase wind resistance. Lastly, windshields are connected to the mounting frame to prevent winds from reaching the undersides of the solar panels. Such a prior art solar panel mounting system is exemplified by the Rapid Rac® system currently being marketed by Unirac of Albuquerque, N. Mex.

The obvious problem with such prior art systems is their complexity. In order to place even a small solar panel array on a roof requires the assembly of hundreds of different brackets, weights, and air deflection panels. The complexity of such mounting systems adds significantly to both the cost and the labor of installing a solar panel array. Another problem with such prior art mounting frames is that they contact the roof only in the location of the support brackets. This concentrates the weight of the solar panel array to specific lines along the roof.

A need therefore exists for a mounting system for solar panels that can be installed using very little time and labor, and with relatively few parts. A need also exists for a mounting system that widely distributes the weight of a solar panel array on a roof, thereby enabling larger arrays to be used. A need also exists for a mounting system that can be manufactured easily and inexpensively. These needs are met by the present invention as described and claimed below.

SUMMARY OF THE INVENTION

The present invention is a mounting system that is used to mount a solar panel array to a flat roof. The system utilizes mounting supports that hold solar panels at an inclined angle. Each mounting support includes a first mounting ledge, a second mounting ledge, a flat base section and an inclined section that is disposed between the flat base section and the first mounting ledge. The first mounting ledge, second mounting ledge, flat base section and inclined section are all integrally formed from a common sheet of metal.

A solar panel is attached between two of the mounting supports. Once mounted, the solar panel extends from the first mounting ledge of a first mounting support to a second mounting ledge of a second mounting support. Weights are then placed on the flat base section of the mounting supports to passively anchor the assembly to the roof.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention mounting system can be used to hold solar panels on roofs with a slight pitch, the exemplary embodiment shows the mounting system used to join solar panels to a flat roof. The exemplary embodiment was selected for purposes of its ease of illustration and should not be considered a limitation upon the claims.

Figure 1:
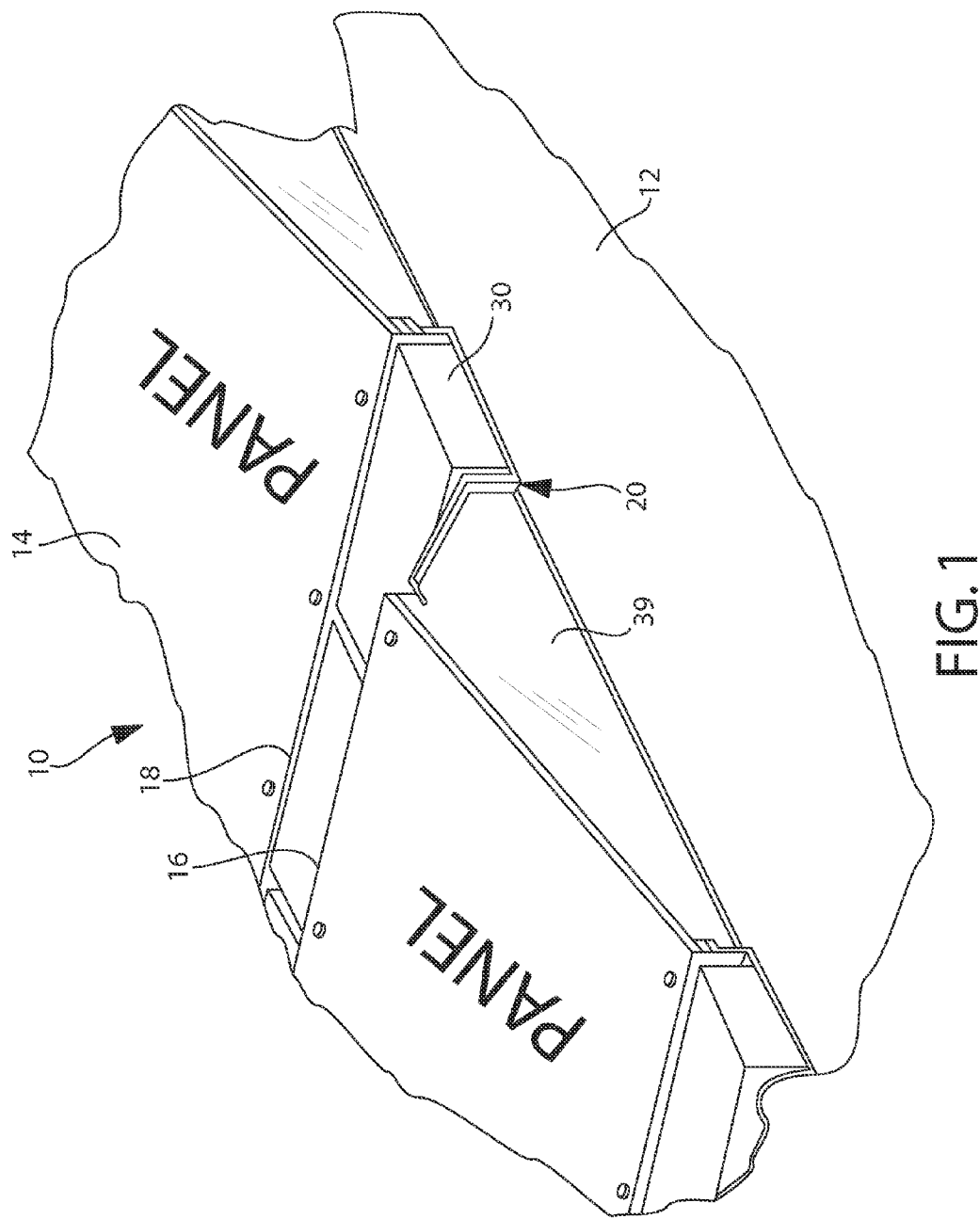
FIG. 1 is a perspective view of an exemplary embodiment of a segment of a solar panel roof array.
Figure 2:
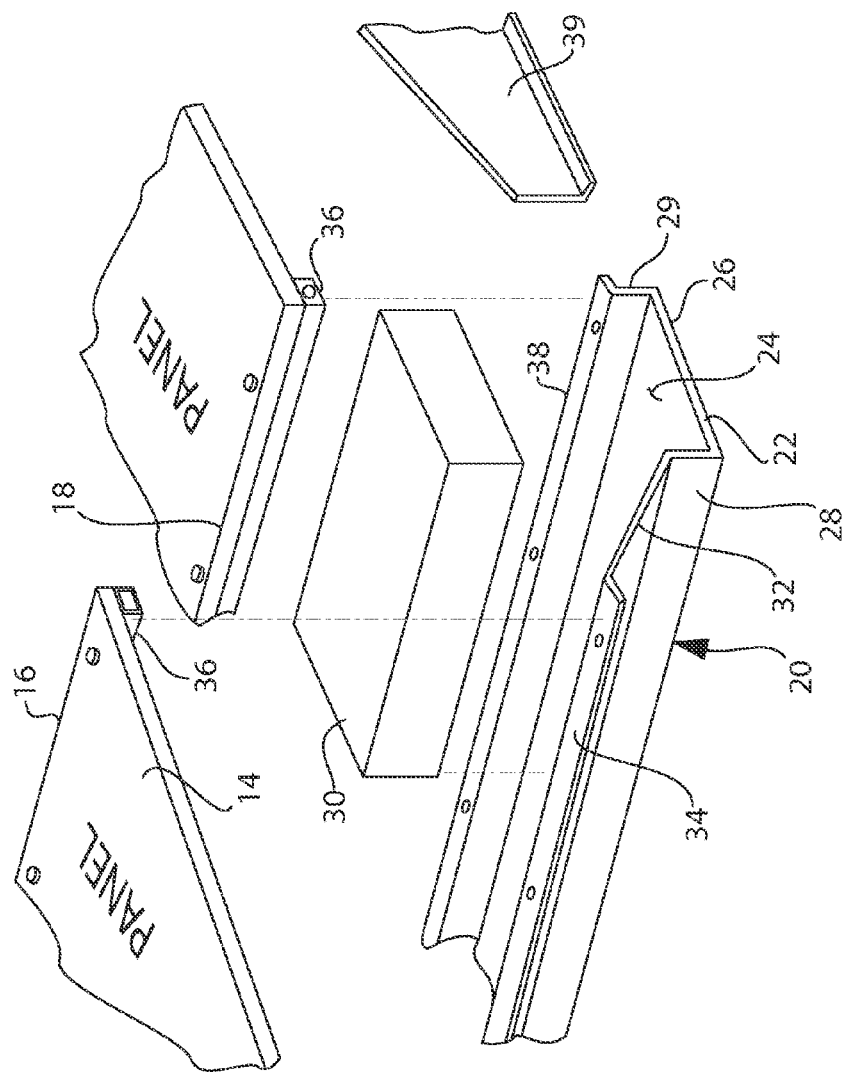
FIG. 2 is an exploded view of the exemplary embodiment of FIG. 1.

Referring to FIG. 1 in conjunction with FIG. 2, a segment of a solar panel array 10 is shown. The solar panel array 10 rests upon the flat roof 12 of a commercial building. The array 10 contains numerous solar panels 14. The solar panels 14 are made in different sizes by different manufacturers. There are also different types of solar panels that are used for different purposes, such as generating electricity or heating water. In the shown embodiment, a rectangular photovoltaic panel is illustrated. Rectangular photovoltaic panels are widely commercially available.

The solar panel 14 is inclined at an angle. Depending upon the location of the array 10, most solar panels 14 face due south and are inclined between ten degrees and thirty-five degrees. It will therefore be understood that each mounted solar panel 14 has an upper edge 16 and a lower edge 18, wherein the upper edge 16 is elevated above the lower edge 18 to produce the desired angle of inclination.

A plurality of mounting supports 20 are provided. The mounting supports 20 are arranged in parallel rows upon the roof. As will later be explained in more detail, each mounting support 20 is made from a single piece of metal. The metal is preferably a weather resistant metal such as aluminum, stainless steel, galvanized sheet metal or the like.

Each mounting support 20 is fabricated from a single sheet of metal 22 that is selectively bent into the form of the mounting support 20. The bends in the sheet of metal 22 can be accomplished by a stamping die or an extrusion die. However, it is preferred that the various bends simply be created by subjecting the sheet of metal 22 to a bending brake. In that manner, the mounting supports 20 can be created with little or no tooling costs. Furthermore, the various bends can be selectively altered to meet the needs of a specific installation location or a specific solar panel.

Figure 3:
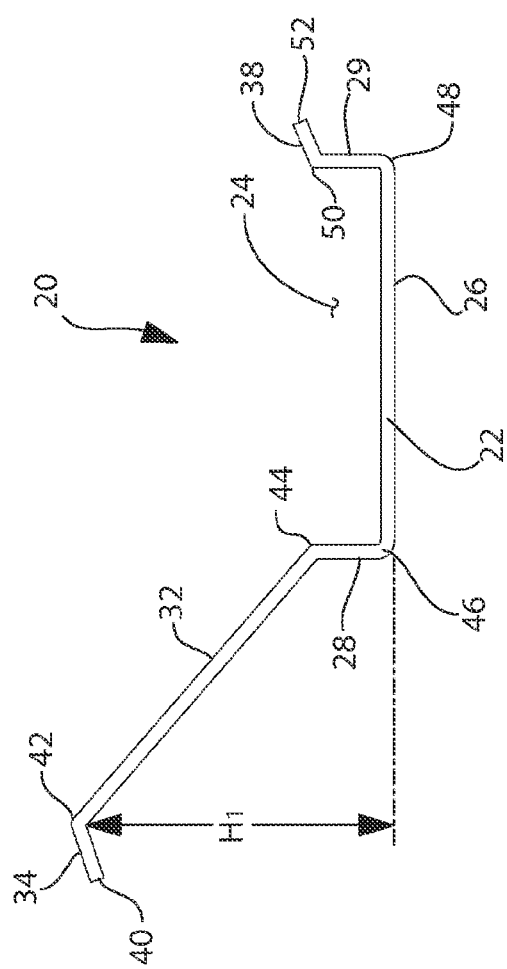
FIG. 3 is a cross-sectional view of a mounting support.

Referring to FIG. 3 in conjunction with FIG. 2, it can be seen that the mounting support 20 includes a weight trough structure 24. The weight trough structure 24 has a flat bottom section 26 that extends between two side walls 28, 29. The side walls 28, 29 can be vertical, but are preferably slightly tilted so that multiple mounting supports 20 can readily nest together when stacked for storage. The weight trough structure 24 extends along the entire length of the mounting support 20. The width of the weight trough structure 24 is sized to receive the ballast weights 30. The ballast weights 30 can be sand bags, water bladders, metal weights or the like. In the shown embodiment, the ballast weights 30 are commercially available concrete blocks. Such ballast weights are weather resistant, heavy, and very low cost. The ballast weights 30 are added in the amount required to meet wind resistance requirements. Heavy arrays require less ballast weights than light arrays.

An inclined section 32 extends upwardly from the first side wall 28 of the weight trough structure 24. The inclined section 32 and the first side wall 28 are continuously formed and meet at a bend joint 44. The angle between the inclined section 32 and the first side wall 28 is preferably between 100 degrees and 160 degrees. The inclined section 32 reaches a predetermined height H1 above the plane shared by the flat bottom section 26 of the weight trough structure 24. The height H1 is typically between one and two feet high. As will later be explained, the height H1 reached by the inclined section 32 can be selectively adjusted by increasing or decreasing the length of the angled section 32, or by increasing or decreasing the angle at the bend joint 44.

An upper mounting ledge 34 is formed at the top of the inclined section 32. The upper mounting ledge 34 is preferably between one and three inches wide. Panel mounts 36 are attached to the upper mounting ledge 34 with mechanical fasteners. The panel mounts 36 receive and retain the upper edge 16 of a solar panel 14. Numerous panel mounts exist in the prior art. Many of these panel mounts can be readily affixed to the upper mounting ledge 34.

A lower mounting ledge 38 extends from the top of the second side wall 29 of the weight trough structure 24. Panel mounts 36 are also attached to the lower mounting ledge 38 with mechanical fasteners. The panel mounts 36 receive and retain the lower edge 18 of the solar panel 14.

As has been previously stated, the mounting support 20 is preferably formed from a single sheet of metal 22 that is selectively bent to form the features of the mounting support 20. The sheet of metal 22 initially has a first edge 40 and an opposite second edge 52. The upper mounting ledge 34 extends from the first edge 40 to a first bend 42. The inclined section 32 extends from the first bend 42 to a second bend 44. The first side wall 28 of the weight trough structure 24 extends from the second bend 44 to a third bend 46. The flat bottom section 26 of the weight trough structure 24 extends from the third bend 46 to a fourth bend 48. The second side wall 29 of the weight trough structure 24 extends from the fourth bend 48 to a fifth bend 50. Lastly, the lower mounting ledge 38 extends from the fifth bend 50 to the second edge 52.

The upper mounting ledge 34 is higher than the lower mounting ledge 38. However, both the upper mounting ledge 34 and the lower mounting ledge 38 exist in parallel planes. Accordingly, when a solar panel 14 is placed between the upper mounting ledge 34 and the lower mounting ledge 38 of adjacent mounting supports 20, the solar panel 14 lay flush upon both surfaces.

Figure 4:
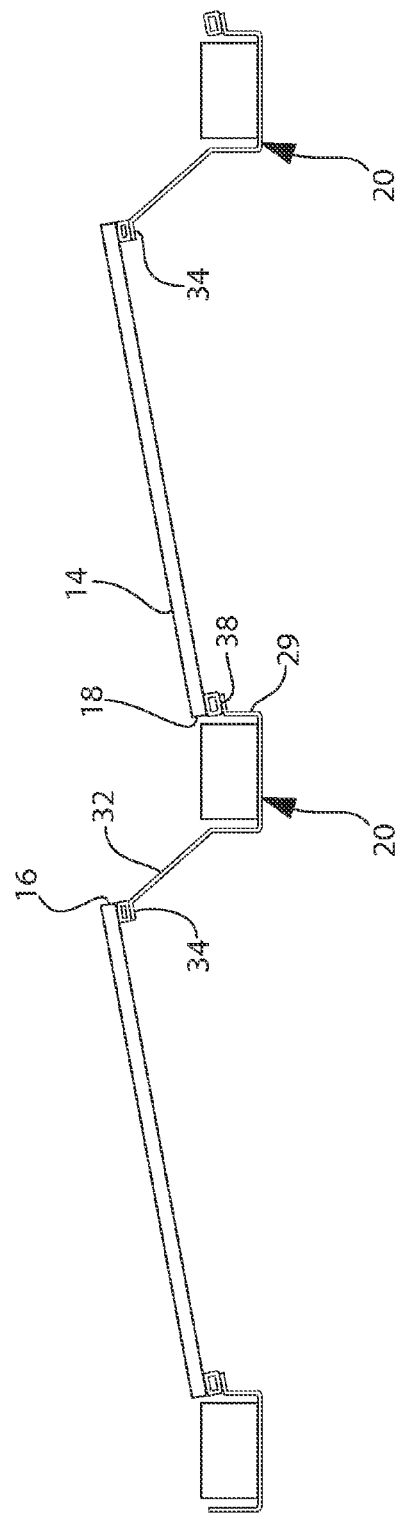
FIG. 4 is a cross-sectional view of a segment of an assembled array.

Referring now to FIG. 4 in conjunction with FIG. 3, it can be seen that the mounting supports 20 are placed in parallel rows, wherein all the mounting supports 20 face in the same direction. Accordingly, the upper mounting ledge 34 from one mounting support 20 always faces the lower mounting ledge 38 of an adjacent mounting support 20. A solar panel 14 is placed between adjacent rows of mounting supports 20. The lower edge 18 of a solar panel 14 connects to the lower mounting ledge 38 of a first mounting support 20. The upper edge 16 of the same solar panel 14 connects to the upper mounting ledge 34 of an adjacent mounting support 20. The solar panel 14 is, therefore, held at an inclined angle with respect to the horizontal. It will be understood that by adjusting the angle of the inclined section 32 and adjusting the distance between adjacent mounting supports 20, the angle of the solar panel 14 can be selectively adjusted.

Once a solar panel 14 is mounted between mounting supports 20, it will be understood that the inclined section 32 of one mounting support 20 extends below the upper edge 16 of that solar panel 14. The inclined section 32, therefore, serves as a wind shield and prevents wind from acting upon the underside of the solar panel 14 from behind. It therefore serves to decrease lift and improve the wind resistance of the array. Likewise the second side wall 29 of a weight trough structure 24 extends below the lower edge 18 of the solar panel 14. This prevents wind from getting under the solar panel 14 from front.

Referring back to FIG. 1 and FIG. 2, it can be seen that side panels 39 are provided. The side panels 39 attach to the sides of the mounting supports 20 under the solar panel 14 and prevent wind from getting under the solar panels 14 from the sides.

From the above, it will now be understood that to install a solar panel array 10, solar panels 14 and mounting supports 20 are brought to the roof 12. The mounting supports 20 require no preassembly. Rather, solar panels 14 can be attached to the mounting supports 20 with no preassembly preparation. The mounting supports 20 can be custom bent to achieve any desired angle of inclination for the solar panels 14. In this manner, the mounting supports 20 can be made to compensate for rooftops that are slightly pitched for water drainage purposes. The solar panels 14 and mounting supports 20 are then arranged into an array 10 on the roof 12. Once properly oriented, the ballast weights 30 are placed in the weight trough structure 24 and side panels 39 are attached to any open side.

The mounting supports 20 require no preassembly. Furthermore, the weighing of the mounting supports 20 requires only the placement of ballast weights 30 into the weight trough structure 24. It will therefore be understood that a solar array 10 can be assembled on a roof 12 in a highly time and labor efficient manner.

It will be further understood that a person skilled in the art can alter the illustrated embodiment of the present invention using functionally equivalent components. For instance, the sides of the weight trough structure, the length of the inclined section and the mounting ledges can all be altered. Furthermore, the weight trough structure can be eliminated by merely using a flat surface upon which weights can be placed. All such variations, modifications, and alternate embodiments are intended to be included within the scope of the present invention as defined by the claims.

What is claimed is:

1. A method of mounting solar panels to a roof, comprising the steps of:
   providing a first solar panel and a second solar panel;
   providing a mounting support, wherein said mounting support is a single sheet of metal selectively bent to form,
      a first mounting ledge;
      a second mounting ledge;
      a flat base section, disposed between said first mounting ledge and said second mounting ledge; and
         an inclined section disposed between said flat base section and said first mounting ledge;
   attaching said first mounting ledge from said mounting support to said first solar panel;
   attaching said second mounting ledge from said mounting support to said second solar panel, therein positioning said flat base section in between said first solar panel and said second solar panel;
   placing weights on said flat base section of said mounting support on said roof.

2. A solar panel array, comprising:
   a plurality of solar panels arranged in parallel panel rows, wherein each of said plurality of solar panels is inclined at an angle of inclination and has an upper panel edge and a lower panel edge;
   a plurality of mounting supports for supporting said plurality of solar panels at said angle of inclination, each of said plurality of mounting supports being a single sheet of metal selectively bent to form a first mounting ledge, a second mounting ledge, a weight trough and an inclined section disposed between said weight trough and said first mounting ledge wherein each said weight trough has a first side, a second side and a flat base extending between said first side and said second side;
   wherein said first mounting ledge supports said upper panel edge of a one of said plurality of solar panels and said second mounting ledge supports said lower panel edge of a different one of said plurality of solar panels, therein positioning each said weight trough in parallel between each of said parallel panel rows; and
   ballast weights disposed within said weight trough of at least some of said mounting supports.

3. The solar panel array according to claim 2, wherein said first mounting ledge and said second mounting ledge extend in parallel planes.

4. The solar panel array according to claim 3, wherein said first mounting ledge extends from a first edge of said common sheet of metal to a first bend.

5. The solar panel array according to claim 4, wherein first side includes an inclined section that extends from said first bend in said common sheet of metal to a second bend.

6. The solar panel array according to claim 5, wherein said first side terminates with a third bend at said flat base.

7. The solar panel array according to claim 6, wherein said flat base section extends from said third bend in said common sheet of metal to a fourth bend.

8. The solar panel array according to claim 6, wherein said second side wall extends from said fourth bend in said common sheet of metal to a fifth bend.

9. The solar panel array according to claim 6, wherein said second mounting ledge extends from said fifth bend in said common sheet of metal to a second edge.

10. A solar panel, array, comprising:
    a plurality of solar panels arranged in parallel panel rows, wherein each of said plurality of solar panels is inclined at an angle of inclination and has an upper panel edge and a lower panel edge;
    a plurality of mounting supports for supporting said plurality of solar panels at said angle of inclination, said plurality of mounting supports being a single sheet of metal selectively bent to form a first mounting ledge, a second mounting ledge, a weight trough and an inclined section disposed between said weight trough and said first mounting ledge defining weight troughs, wherein each of said weight trough troughs has a first side, a second side, and a flat base extending between said first side and said second side;
    wherein said first side of each of said weight troughs mounting ledge supports said upper panel edge of a one of said plurality of solar panels and said second side of each of said weight troughs mounting ledge supports said lower panel edge of a different one of said plurality of solar panels, therein positioning each said weight trough troughs in parallel between each of said parallel panel rows
    wherein each of said plurality of mounting supports is a single sheet of metal selectively bent to form said first side, said second side and said flat base.

11. The solar panel array according to claim 10, further including removable weights placed within at least some of said weight troughs.

* * * * *